Patented Jan. 13, 1948

2,434,303

UNITED STATES PATENT OFFICE 2,434,303

MEANS AND METHOD OF FORMING GLASS

Woldemar A. Weyl, State College, Pa., assignor to American Optical Company, Southbridge, Mass., a voluntary association of Massachusetts No Drawing. Application May 18, 1943, Serial No. 487,494

3 Claims. (Cl. 106—52)

This invention relates to silica containing glasses and has particular reference to novel means and method of obtaining said glasses.

One of the principal objects of the invention is to provide a silica containing glass and novel means and method of obtaining said glass whereby the usual prior art difficulties of formation of scum during the glass melt is overcome and the resultant silica content in the glass may be more positively controlled.

Another important object of the invention is to initially change the silica which is to be added to the glass batch so that it will react more positively with the other ingredients of the glass melt and thereby provide a more homogeneous glass structure containing said silica.

Another object is to initially break down the three dimensional linkage characteristics of silica as occurring in quartz sand or feldspars to a more loosely linked structure whereby the said silica will react more readily in the initial melt.

Another object is to so initially alter the silica which is to be placed in a glass batch that the said silica will more readily dissolve in the first liquid formation of the glass melt whereby there will be substantially no formation of scum as has been usual with prior art melts of this nature.

Another object is to provide more positive means and method of controlling the silica content in phosphate and borate glasses.

Other objects and advantages of the invention will become apparent from the following disclosure and it will be apparent that many changes may be made without departing from the spirit of the invention as expressed in the accompanying claims. The invention, therefore, is not to be limited to the specific disclosure given as the said disclosure is only set forth by way of illustration.

In most instances in the past in forming silica containing glasses great difficulty has been encountered in incorporating the silica in the glass so as to avoid the formation of scum and so as to control the resultant silica content of the glass.

Silica as a rule is introduced in the form of glass sand which consists of quartz. Quartz is one of the crystalline forms of silica representing a three-dimensional crystal lattice of $SiO_4$ tetrahedra which are interlinked in a way that each oxygen atom belongs to two different tetrahedra. If silica is placed in the glass melt in the above form it has been found that great difficulty is encountered in the nature of a scum which forms on the top of the glass melt and which must be removed prior to the final fabrication of the glass.

This scum formation is primarily due to the fact that silica, when in its three-dimensional state, has a high melting point and does not readily dissolve into the other ingredients of the melt particularly the initial fluid formed. This is exceptionally true when said initial liquid has a weak solvent action on the silica as is the case with certain phosphate and certain borate glass melts.

The formation of scum is due primarily to the fact that if the silica is not quicky dissolved in the initial liquid, then at the high temperature of the melting the mineral quartz converts to cristobalite, the high temperature crystalline form of silica, with a large expansion in volume and consequently a low density. On account of its lightness the cristobalite will float on the surface of the liquid in a physical condition which is very unfavorable to solution and which must be removed, stirred into the batch or otherwise dissolved or eliminated by chemical means. This all leads to difficulty in controlling the composition of the resultant glass and consequently its physical properties.

It is quite obvious that if scum is allowed to form during the glass melting and requiring the removal thereof no positive and definite control of the silica content can be obtained. In most glasses, this is very detrimental as it is quite essential that the proportion of each ingredient of the glass melt be positively controlled in order to enable reproduction of similar melts. For example, if an attempt is being made to produce an optical glass having a certain controlled index of refraction which is desired to be duplicated to within two units of the 4th decimal place, melt after melt and year after year, it is very important that positive control of the composition be established.

Another disadvantage resulting in instances when such scum formation exists is in the production of glasses where a strong reducing condition must be maintained within the melt and during the process of skimming off or stirring in the scum this reducing condition may be lost.

In certain types of glasses, in the past, for example, boric oxide glass and phosphate glass, silica could only be introduced with a very low rate of solution. For a long time, it was believed that silica and boric oxide were immiscible. Both oxides, however, are completely miscible, the process of homogenizing requiring a very long time even at high temperatures. This is also true with phosphate glasses. The relatively low melting characteristics of such glasses renders said glasses very weak as solvents for the silica, that is, they are not powerful enough to destroy the quartz structure by breaking it down to separate SiO4 units which will enable the obtaining of a homogeneous glass. This lack of reactivity leads to the formation of scum.

It has also been found that such scum formation occurs in soda-lime-silicate glases which are the most commonly used types of glasses and in such cases it has been found advantageous to introduce some of the alkali in the form of sodium sulphate. Scum formation occurs in soda-lime-silicate glasses whenever the rate of the quartz conversion into cristobalite is greater than the rate at which the quartz goes into solution in the melt. By the addition to the batch of sodium sulphate, which itself is only slightly soluble in the soda lime glass, the scum can be eliminated because some of the sodium sulphate will float on top of the melt where it provides a source of undiluted corrosive alkali according to the equation:

$$Na_2SO_4 = Na_2O + SO_2 + \tfrac{1}{2}O_2$$

The alkali in turn will react with the scum and bring the cristobalite into solution and cause it to homogenize with the glass melt proper. Any excessive amount of sodium sulphate can be easily removed by reducing melting conditions or by throwing carbon onto the surface of the melt.

In phosphate glasses scum removal by the addition of sodium sulphate can not be recommended for two reasons:

(1) Sodium may be undesirable in said phosphate glasses.

(2) Excessive sodium sulphate could not be removed by the reduction techniques described above because phosphate glasses are quite sensitive to reducing conditions and elementary phosphorus would be lost by distillation.

The present invention, therefore, is directed particularly to overcoming the above difficulties in any silica containing glass through the breaking down of the three-dimensional characteristics of the silica prior to adding said silica to the batch so as to produce a structure which will readily dissolve in the initial liquid formation of the melt. The invention, however, is directed more particularly to the formation of phosphate and borate type glasses containing silica as such glasses in the past have been more difficult to obtain. The altering of the silica to a state where it may be more readily dissolved is accomplished by breaking down the O—Si—O—Si linkages and thereby causing the silica to be introduced in a form which does not contain three dimensional bonds. The silica in this instance is in the form of isolated SiO4 units or silicate chains. This requires less energy to isolate the silica units and lets them diffuse into the glass solution more readily. For example, in choosing the particular glass ingredient to be employed as the source of silica, one should first consider the other ingredients shown to be present in the glass formula and then select the most practical means for introducing the silica into said glass composition. If the formula contains alkali, such as Na2O, sodium silicates are a suitable and economical means of obtaining silica in such broken down units. If the glass is to be low in alkali or free from alkali but contains alkaline earth, various alkaline earth silicates can be used as a means of introducing broken down silica, for example, calcium silicates, barium silicates or zinc silicates may be used to obtain such compositions.

In general, there may advantageously be used any silicates having the formula $R_nSiO_3$ or $R_nSiO_4$. These formulas indicate metasilicates or orthosilicates with R meaning monovalent or divalent cation leading to the weaker structure desired. At the silicon oxygen ratio of the metasilicates which is 1:3, two dimensional SiO3 chains are formed. At the silicon oxygen ratio of orthosilicates which is 1:4 isolated individual SiO4 units are formed. These metasilicates and orthosilicates do not possess the same strong three-dimensional network characteristics as with pure SiO2 where the Si:O ratio is only 1:2 and consequently their silica content can be much more easily absorbed by a melt of glass. In the first place, it is not necessary to break down the oxygen silicon linkages which require very high energy and in the second place the small individual units can be diffused more readily through the liquid structure. Therefore, it is recommended that when silica is to be introduced into critical glass melts such as phosphate and borate glasses the silica should be introduced in the form of metasilicates, orthosilicates or other silica containing compounds where the silica is broken down from the strong continuous three dimensional linkage characteristics of quartz.

From the foregoing description it will be seen that simple, efficient and economical means and methods have been provided for obtaining all of the objects and advantages desired.

Having described my invention, I claim:

1. In the process of forming a phosphate glass batch containing silica the step comprising initially chemically combining all the silica with at least one of the major basic oxides included in the formula, and adding the silicates so formed to the batch.

2. In the process of forming a phosphate glass batch containing silica the step comprising initially chemically combining all the silica with at least one of the bivalent oxides included in the formula, and adding the silicates so formed to the batch.

3. In the process of forming a phosphate glass batch containing silica, the step of adding all the silica to the batch as artificially formed silicates, said silicates comprising the product of the chemical combination of the silica with at least one of the major basic oxides included in the formula.

WOLDEMAR A. WEYL.

REFERENCES CITED

The following references are of record in the file of this patent:

UNITED STATES PATENTS

| Number | Name | Date |
|---|---|---|
| Re. 15,727 | Crossley | Dec. 4, 1923 |
| 51,343 | Napier et al. | Dec. 5, 1865 |
| 52,917 | Washburn | Feb. 27, 1866 |
| 285,436 | Shepard | Sept. 25, 1883 |
| 494,636 | Jensen et al. | Apr. 4, 1893 |
| 522,001 | Hyling | June 26, 1894 |
| 1,394,973 | Crossley | Oct. 25, 1921 |
| 1,489,026 | d'Adrian | Apr. 1, 1924 |
| 1,522,697 | Parsons | Jan. 13, 1925 |
| 1,694,831 | Rothe et al. | Dec. 11, 1928 |
| 2,091,691 | Scholes | Aug. 31, 1937 |
| 309,741 | Rosenzi | Dec. 23, 1884 |
| 1,091,678 | Locke | Mar. 31, 1914 |

FOREIGN PATENTS

| Number | Country | Date |
|---|---|---|
| 2,537 | Great Britain | 1855 |